United States Patent [19]
Meyerhofer et al.

[11] Patent Number: 5,619,373
[45] Date of Patent: Apr. 8, 1997

[54] OPTICAL SYSTEM FOR A HEAD MOUNTED DISPLAY

[75] Inventors: Dietrich Meyerhofer, Princeton; Herschel C. Burstyn, Plainsboro, both of N.J.

[73] Assignee: Hasbro, Inc., Pawtucket, R.I.

[21] Appl. No.: 485,370

[22] Filed: Jun. 7, 1995

[51] Int. Cl.⁶ .................................................. G02B 27/22
[52] U.S. Cl. .............................. 359/482; 345/7; 359/407; 359/630; 359/640
[58] Field of Search ........................... 359/400, 404, 359/407, 431, 480, 482, 495, 496, 566, 569, 571, 573, 575, 583, 629–634, 639, 640, 831, 837; 345/7–9

[56] References Cited

U.S. PATENT DOCUMENTS

| | | | |
|---|---|---|---|
| 2,818,765 | 1/1958 | Foster | 359/571 |
| 3,642,349 | 2/1972 | Bestenreiner et al. | 359/466 |
| 3,680,946 | 8/1972 | Bellows | 359/505 |
| 4,561,731 | 12/1985 | Kley | 359/36 |
| 4,704,004 | 11/1987 | Nosker | 359/49 |
| 4,737,447 | 4/1988 | Suzuki et al. | 430/321 |
| 4,770,525 | 9/1988 | Umeda et al. | 353/122 |
| 4,821,114 | 4/1989 | Gebhardt | 358/512 |
| 4,878,735 | 11/1989 | Vilums | 359/462 |
| 5,035,473 | 7/1991 | Kuwayama et al. | 359/13 |
| 5,035,474 | 7/1991 | Moss et al. | 359/13 |
| 5,089,903 | 2/1992 | Kuwayama et al. | 359/15 |
| 5,130,794 | 7/1992 | Ritchey | 348/39 |
| 5,151,722 | 9/1992 | Massof et al. | 351/158 |
| 5,151,823 | 9/1992 | Chen | 359/565 |
| 5,153,569 | 10/1992 | Kawamura et al. | 345/8 |
| 5,161,057 | 11/1992 | Johnson | 359/566 |
| 5,210,626 | 5/1993 | Kumayama et al. | 359/13 |
| 5,245,472 | 9/1993 | Hegg | 359/496 |
| 5,253,108 | 10/1993 | Latham | 359/482 |
| 5,266,930 | 11/1993 | Ichikawa et al. | 345/8 |
| 5,347,400 | 9/1994 | Hunter | 359/630 X |
| 5,418,584 | 5/1995 | Larson | 359/629 X |
| 5,436,763 | 7/1995 | Chen et al. | 359/630 X |
| 5,488,508 | 1/1996 | Haseltine | 359/407 X |
| 5,526,184 | 6/1996 | Tokuhashi et al. | 359/630 |

*Primary Examiner*—John D. Lee
*Attorney, Agent, or Firm*—Hughes Hubbard & Reed LLP

[57] ABSTRACT

An optical system for a Head Mounted Display for a virtual reality system that employs a single high-resolution display to generate separate right-eye and left-eye images for presentation to a user. The display projects a single image onto an array of adjacent lenses that serve to magnify it, and to project the image onto an optically distant diffuser screen. The diffuser screen, which increases the angular dispersion of the image, is in close proximity to a columnar array of microprisms. The microprism beam splitter serves to split the single image into separate right-eye and left-eye component images, and to direct each component image to its respective eyepiece at an off-axis angle. The optical system further includes two separate eyepieces, each including Fresnel lens/prisms that redeflect their respective images onto optical axes which are parallel to, but laterally displaced from the original, central optical axis. Color correction is achieved by the use of a single diffraction grating that corrects the lateral color dispersion introduced by the deflecting Fresnel lens/prisms. A toroidal lens directly in front of each eye, but slightly displaced horizontally from the eye's optical axis, serves to equalize the angular magnification in the x- and y-directions, while symmetrizing the y-axis astigmatism about the center of the eye.

18 Claims, 6 Drawing Sheets

FIG. 2B
PRIOR ART
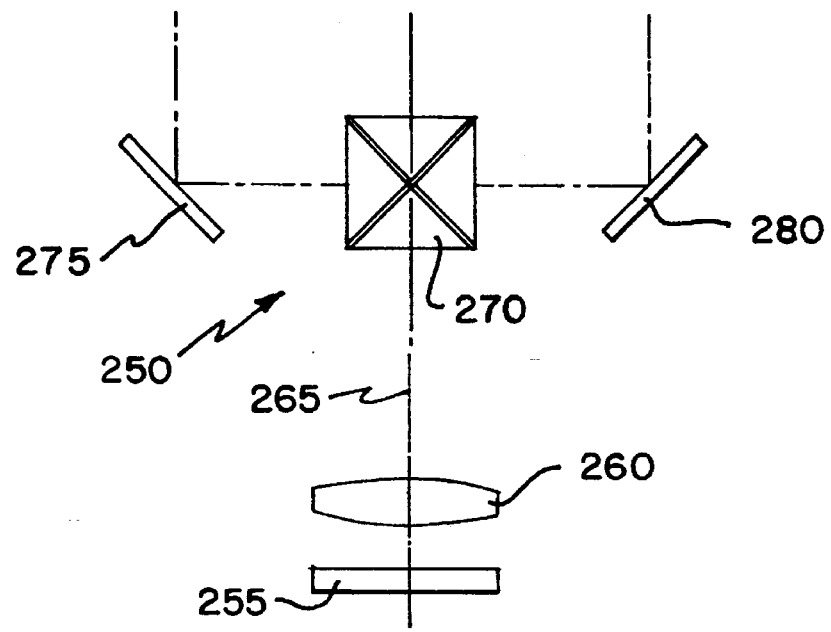
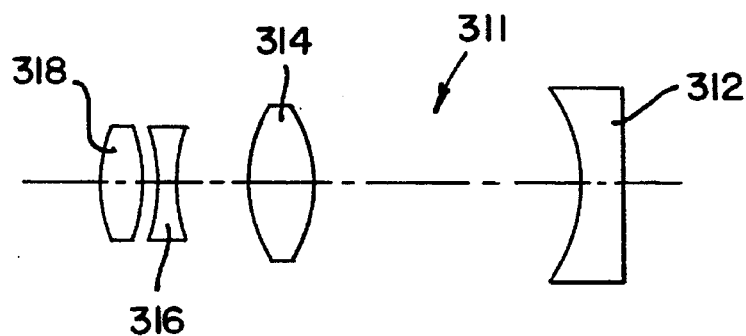
FIG. 4
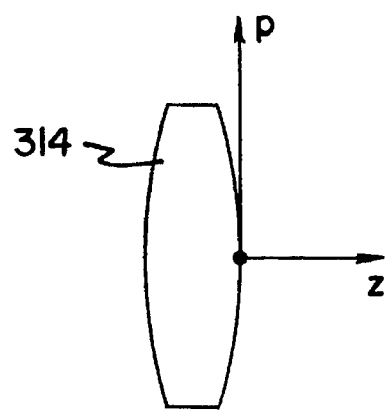
FIG. 5

OPTICAL SYSTEM FOR A HEAD MOUNTED DISPLAY

FIELD OF THE INVENTION

This invention relates generally to optical systems and more particularly to an optical system for a head mounted display employing a single display device.

BACKGROUND OF THE INVENTION

The slowness with which the market for virtual-reality systems has grown is largely attributable to the high cost, large size and unwieldy nature of the head-mounted display (HMD) normally associated with such systems. These attributes of the HMD have restricted that market to specialty niches and have prevented its expansion into the juvenile and adult recreational area, where a vast market potential exists.

To achieve the depth perception that is of central importance in virtual reality system, typical HMDs use a pair of video displays, in conjunction with two separate and independent optical systems, one for each of the user's eyes. The two independent optical systems present right and left-hand images to the respective eyes that, together, simulate depth. The requisite image magnification and correction of color dispersion are typically addressed through an array of a half-dozen refractive lenses per image. Each of those arrays typically has a physical length on the order of double its effective focal length. The resultant HMD which includes two separate optical systems is both massive in physical size and weight, and wholly impractical for use in a recreational application, even if its price were affordable.

Although none of the prior art concerning displays touches on the teachings of the present invention, Johnson, in U.S. Pat. No. 5,161,057, teaches the use of small-scale diffraction grating facets molded onto large-scale Fresnel lens facets, to compensate color dispersion in solar-energy concentrators. While bearing superficial resemblance to certain aspects of the present invention, Johnson's teachings yield optical results that are inappropriate to display systems, primarily because their use would result in images that were color fringed or "haloed". Such halos may be of little consequence when focusing the solar spectrum onto a heat transfer device as in the device of Johnson, but the same halos would be an unacceptable, eye-straining flaw in a optical system for a display.

Johnson's approach to color correction imposes on the Fresnel lens a design constraint that its facet periodicities be consonant with the periodicities of the diffractive structure. This is necessary to ensure that the diffractive facet at the edge of each Fresnel facet is not truncated, an important consideration with a grating of such extremely low line density. A second, more serious problem results from the discontinuities in the diffractive structure caused by the Fresnel facets, as illustrated in FIG. 1A and the more detailed view in FIG. 1B. These discontinuities introduce the haloing problem observed and mentioned by Johnson (see Johnson col. 3, lines 19–22), though he offers no explanation for that puzzling phenomenon. A third drawback of Johnson's approach is that it requires concentricity of the Fresnel and grating structures, thus eliminating their off-axis displacement from one another as a convenient design option. An additional deficiency with Johnson's approach is that it is almost impossible to produce a phase continuity over the large step at the edge of the facets of the Fresnel lens (step height as much as 0.5 mm). Therefore, the coherent grating effect is limited to one Fresnel facet (approximately 40 grating periods). Such a grating causes collimated light to be spread 0.5–1.0 degrees. This is not significant in Johnson's solar energy application, but would cause significant aberrations in an imaging system such as the present invention.

FIGS. 1A and 1B, adapted from Johnson, illustrate Johnson's method of correcting color dispersion. Diffraction grating facets are formed as concentric rings on the Fresnel-lens surface. A segment of Fresnel lens 32 is shown in FIG. 1B, so that the facets, 37 of the color compensating diffraction grating can be seen more clearly. The color haloing problem previously discussed can be traced to the discontinuities introduced into the diffraction grating by Johnson's arrangement. The view of greatest enlargement shows the region at the edge of a single Fresnel facet. Note that while light ray A, that is parallel to the optical axis, passes through only one grating facet 37, light ray B, which typifies light rays that deviate from strict parallelism to the optical axis, passes not through one grating facet, but through two facets. In this example light ray B passes through grating facet 38 on the crest of the Fresnel facet, and then passes through a second grating facet 39 near the trough of the contiguous Fresnel facet.

Several prior art systems have made use of a single video display source, such as an LCD, but have used two different methods of splitting the image from the single display into separate right and left eye images. FIG. 2A illustrates a typical prior art method of beam splitting using "half mirrors". Optical system 200 of the prior art includes a display 205 and a projection lens 210 such that the image from display 205 is centered along optical axis 215. Disposed at 45° with respect to axis 215 is a half mirror beam splitter 220. Half mirror 220 is constructed and arranged such that the reflection factor and transmission factor thereof are each about 50% with respect to the light from projection lens 210. Half mirror 220 splits the image from display 205 into two separate images 225 and 230. Full mirror 235 reflects split image 225 towards mirror 245 along an axis parallel to the other split image 230. Mirrors 240 and 245 serve to direct the two split images towards the user's two eyes.

FIG. 2B illustrates another typical prior art system 250 which incorporates an x-prism beam splitter, 270. System 250 uses a conventional display 255 and a projection lens 260 in order to generate an image along optical axis 265. An x-prism beam splitter 270 is disposed in this optical path in order to split the single image into separate right and left hand images for the user's two eyes. A conventional x-prism 270 is composed of four pieces of glass with a metal or dielectric coating on one side of each piece. These four pieces are bonded together to form an "X". Light entering cube 270 is split four ways, 25% each to the right and left and 25% each up and down. The light going up and down is entirely wasted. Conventional x-prisms employ the 50%–50% half mirror coatings described above, but since the light from lens 260 must pass through these coatings twice before exiting x-prism 270, the maximum theoretical efficiency is 25% and typical prisms are only 15% efficient. This low efficiency is due to the fact that if metal coatings are used for conventional x-prisms, there is considerable absorption, and for dielectric coatings, the efficiency is tempered by the need for a wide angular bandwidth.

As seen in the above two FIGS., 2A and 2B, the preferred method of the prior art for redirecting the split images towards a user's eyes is by the use of standard fold mirrors 240, 245 and 275, 280. The use of these fold mirrors places limitations on the permitted field of view of the HMD, increases the size of the HMD and the complexity of alignment of the optical elements.

It is an object of the present invention to incorporate a single display into a Head Mounted Display, while still providing separate right and left eye images. It is also an object of the invention to use low cost injection molded elements in the optical system. It is a further object to use Fresnel lenses and prisms in the optical system wherever possible. A further object of this invention is to provide a display that is software upgradable, so that the basic software will provide simulated depth perception, while the advanced software can provide true stereoscopic vision.

SUMMARY OF THE INVENTION

The present invention is an optical system for a Head Mounted Display for a virtual reality system that employs a single high-resolution display to generate separate right-eye and left-eye images for presentation to a user. The display, typically of the liquid-crystal variety, projects a single image onto an array of adjacent lenses that serve to magnify it, and to project the image onto an optically distant diffuser screen. In a preferred embodiment, the projection of the image from the liquid crystal display to the diffuser screen is along a folded optical path. The diffuser screen, which serves to increase the angular dispersion of the image, is in close proximity to a novel columnar array of microprisms. The novel microprism beam splitter serves to split the single image into separate right-eye and left-eye component images, and to direct each component image to its respective eyepiece at an off-axis angle. The optical system further includes two separate eyepieces, one for each of the user's eyes. Each eyepiece includes Fresnel lens/prisms that redeflect their respective images onto optical axes which are parallel to, but laterally displaced from the original, central optical axis. Color correction is achieved by the use of a single diffraction grating that corrects the lateral color dispersion introduced by the deflecting Fresnel lens/prisms. A toroidal lens directly in front of each eye, but slightly displaced horizontally from the eye's optical axis, serves to equalize the angular magnification in the x- and y-directions, while symmetrizing the y-axis astigmatism about the center of the eye. Preferably, all optical elements are formed of optical quality molded plastic, to minimize weight and manufacturing cost.

BRIEF DESCRIPTION OF THE FIGURES

FIGS. 2A and 2B illustrate prior art optical systems which use a single display in a Head Mounted Display application.

FIG. 4 shows an enlarged view of the magnification optics of the present invention.

FIG. 5 is an enlarged view of one of the projection lenses of the magnification optics.

DETAILED DESCRIPTION OF THE PREFERRED EMBODIMENT

Figure 3:
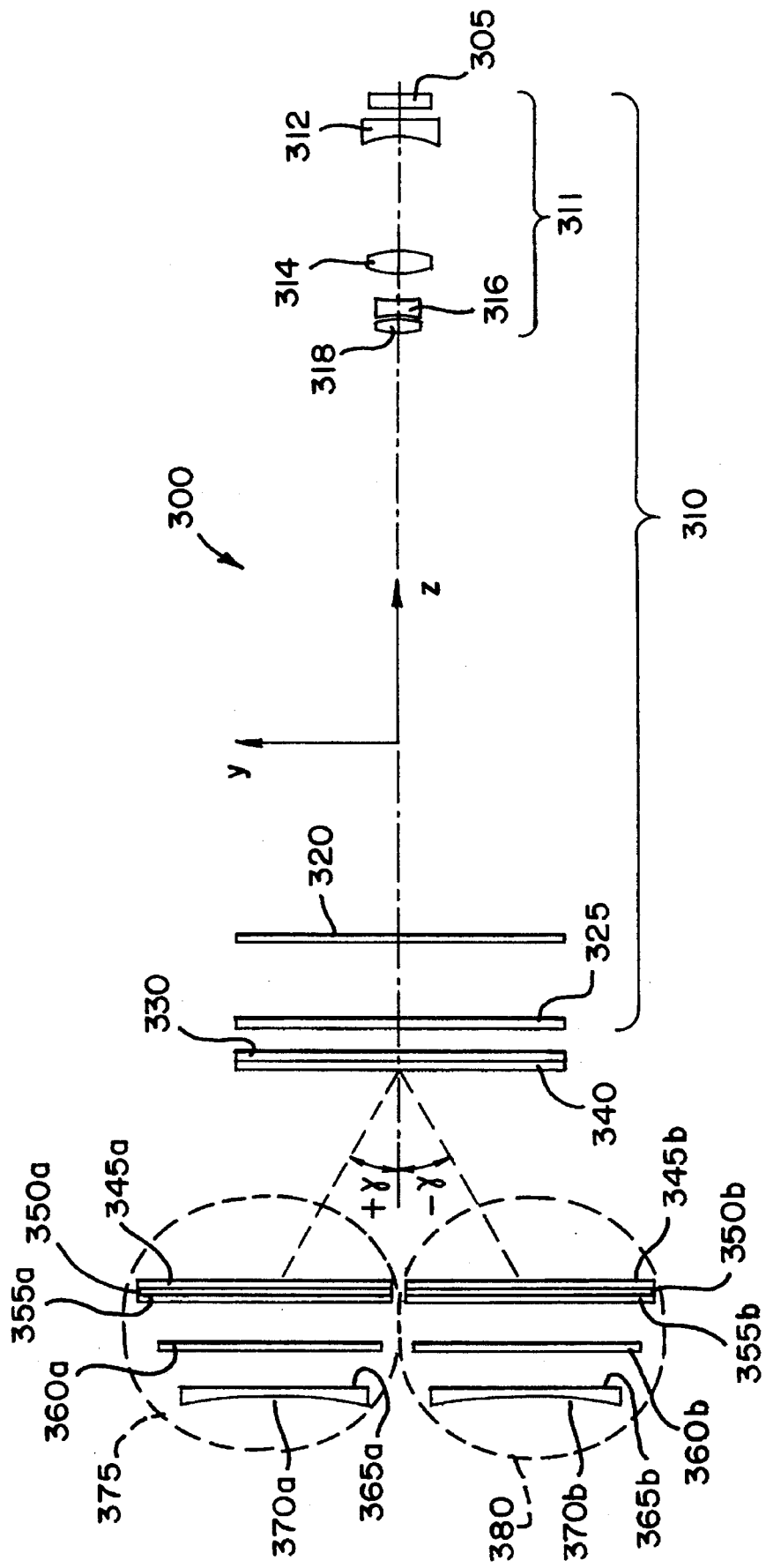
FIG. 3 illustrates the optical system of the present invention.

FIG. 3 illustrates a preferred embodiment of the optical system 300 of a head-mounted display (HMD) according to the present invention. The interlens spacing, lens parameters and lens-surface defining equations presented herein are merely illustrative, since numerous other individual lenses, combinations thereof and configurations may be employed within the scope of the inventive matter that will be subsequently claimed. However they are set forth here to demonstrate that the principles taught in this invention are readily reducible to practice. Where lens equations are given, note that all dimensions are in millimeters. In this figure, z defines the optical axis of the image source, the positive direction of the z axis being away from the viewer. The y axis is perpendicular to the z axis in the plane of the Figure, and the x axis is orthogonal to the plane created by the y-z axes.

Display 305 is used to generate a source image which is magnified and projected by a projection lens system 310. In the preferred embodiment, display 305 is a back-lit liquid crystal display. The use of such an LCD yields images whose brightness is achieved by inexpensive external illumination which reduces the cost and weight of the HMD assembly. In one embodiment of the present invention, the LCD measures 11.4 by 18.2 mm and contains an array of approximately 200 by 320 pixels. Each pixel is approximately 0.06 by 0.06 mm and contains red, green and blue elements. Such LCDs are commercially available from sources such as Seiko-Epson. Although in the preferred embodiment display 305 produces the same image for both right and left eye viewing, distinct right-eye and left-eye images may be generated in numerous ways, such as by methods of interdigitizing, interlacing or sequencing. Such methods would be accomplished by the video system driving display 305. It is an advantage of the present optical system that it can accommodate a single image, as in the preferred embodiment described herein, but it can also separate interdigitized images into distinct left and right eye images.

The projection lens 310 system creates a magnified image of the display 305 onto the diffuser element 330. Projection lens system 310 comprises six separate lenses, 312, 314, 316, 318, 320 and 325 which are each symmetric about the z axis. In the preferred embodiment, these lenses 312–325 are manufactured from either acrylic or styrene. These two materials provide easy manufacturing at low weight and are generally shatterproof. The magnification section 311 of projection lens system 310 is shown in an enlarged view in FIG. 4. As seen in FIG. 4, lens 312 is a plano-concave field flattener lens, which serves to deflect the light coming from display 305 into the enlarging section. Lens 312 does not add any optical power. It may be molded from styrene or acrylic, the choice depending on the amount of chromatic correction that is required. The radius of curvature of lens 312 is 15 mm. The diameter of the clear aperture on the plano side of the lens is 17.5 mm, while the clear aperture diameter on the concave side is 15 mm. The thickness of the lens is approximately 4 mm at its center.

In an alternative embodiment, the plano side of lens 312 may be changed to a slightly convex shape in order to improve the manufacturability of the lens. In this alternative embodiment of system 300 depicted in FIG. 10, lens 312' is spherical with a meniscus shape. The convex side of lens 312' has a radius of curvature of 300 mm while the concave side has a radius of curvature of 15.78 mm. The thickness at the center of this alternative embodiment lens 312 is approximately 3 mm.

As shown in FIG. 4, the actual enlarging section of the magnification section 311 is of the Petzval type and consists of lenses 314, 316, and 318. The optical power is split into two positive elements, the acrylic bi-convex lens 314 and the doublet, lens 316 and lens 318. Two elements are used, rather than a single one, in order to reduce the aberrations in projection lens system 310. Bi-convex lens 314 has both of its surfaces shaped with aspheric components to correct various aberrations in the image.

Lens 314 is shown in greater detail in FIG. 5. As shown in this figure, the surface of lens 314 that faces display 305 is a conic section formed in accordance with the following equation:

$$z = \frac{-r^{-1}p^2}{1+(1-r^{-2}(k+1)p^2)^{1/2}}$$

where z is the axial distance of the lens surface in the direction of the z axis of the lens, p is radial distance of the lens surface from the z axis, conic constant k=−1.52, and the radius of curvature r=16.9 mm. The surface of lens 314 that faces away from the display is simply a spherical surface defined by its radius of curvature, r=35.7 mm. In the alternative embodiment of system 300 depicted in FIG. 10, lens 314', is constructed as a biconcave aspherical lens, whose display (305) facing conic surface is described by the above equation, but whose radius of curvature r=35.15 mm, with a conic constant k of −2.082. The opposite surface of the alternative embodiment lens 314' is similarly a conic surface manufactured to the same equation as above, but with a radius of curvature r of 19.62, and a conic constant k of −1.589. The thickness at the center of the alternative lens 314' is approximately 8 mm.

The second positive element of enlarging section 311 shown in FIG. 3 is built as a doublet, consisting of lenses 316 and 318. These lenses are formed respectively of styrene and acrylic. The indices of refraction of lenses 316 and 318 closely approximate, and therefore make them the counterparts respectively, of flint and crown glass. The doublet provides color correction in addition contributing to the magnification. Lens 316 is bi-concave, with respective radii of curvature of its display-facing and viewer-facing surfaces of 69 mm and 15 mm. The diameter of the clear aperture of this lens is 10 mm and its thickness is approximately 2.5 mm. Lens 318 is bi-convex, with respective radii of curvature of its display-facing and viewer-facing surfaces of 19.5 mm and 26.9 mm. The diameter of the clear aperture of lens 318 is 10 mm and the thickness at its center is approximately 3.5 mm.

Figure 10:
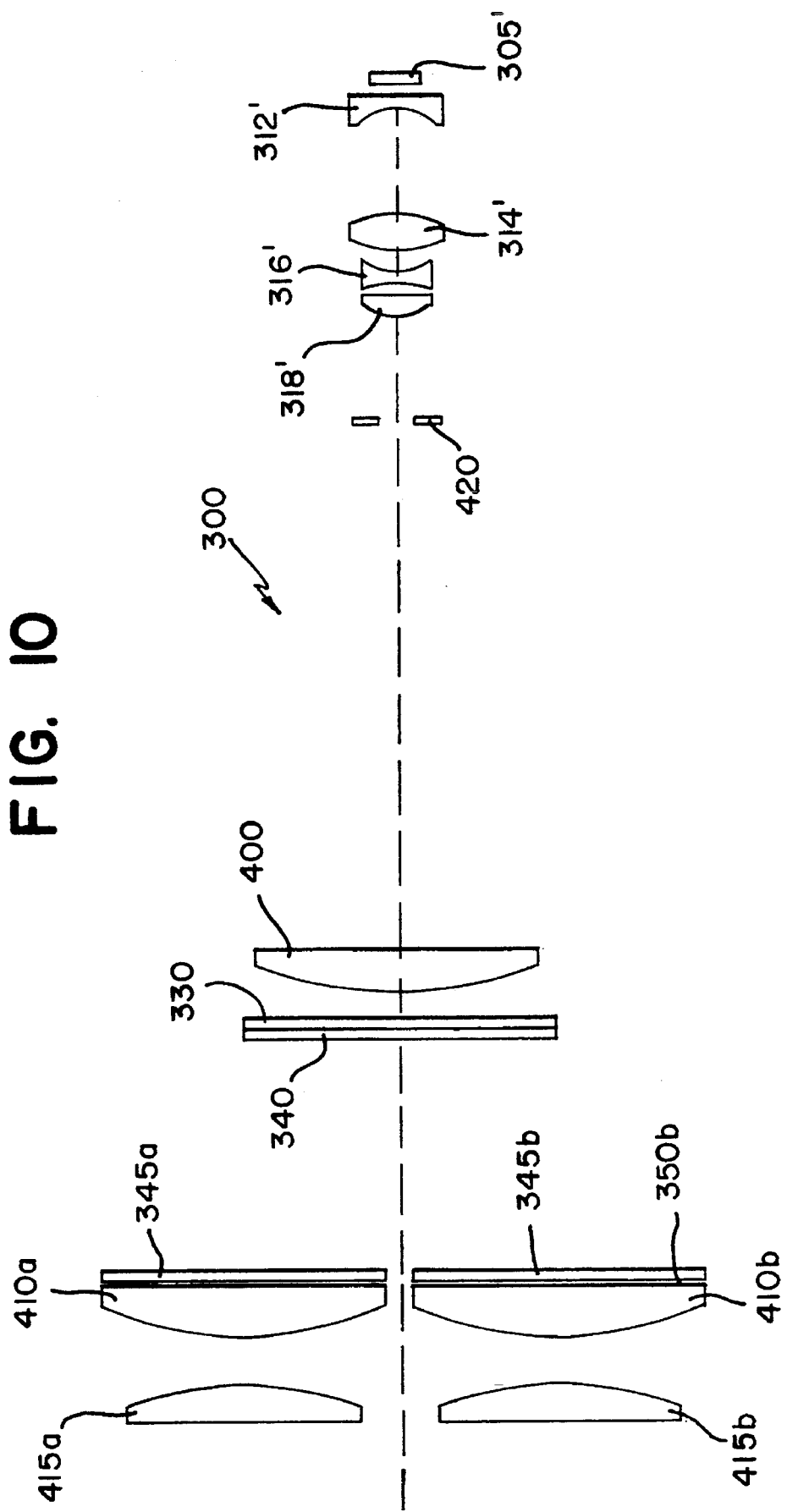
FIG. 10 illustrates an alternative embodiment of the optical system of the present invention shown in FIG. 3.

In the alternative embodiment of system 300 depicted in FIG. 10, lens 316' has radii of curvature of the display facing and viewer facing surfaces of 18.69 mm and 29.868 mm respectively, with an approximate thickness at its center of 4 mm. The alternative embodiment of lens 318', shown in FIG. 10, has respective radii of curvature for its display and viewer facing surfaces of 64.892 mm and 16.324 mm. The thickness at center of the alternative lens 318' is approximately 5.5 mm with a clear aperture diameter of 18 mm. Also shown in FIG. 10 is an optional stop 420. Stop 420 represents the entrance pupil of the enlarging portion. Locating a physical stop at this position will reduce the effect of stray light and increase the contrast of the image. The degree of improvement is small in certain configurations, but may be larger in others.

Returning to FIG. 3, the structure and function of lenses 320 and 325 will be discussed. Lens 325 primarily serves to redirect the light from enlargement section 311 in a direction approximately co-linear with the z axis, so that all the light passes through the subsequent optical elements. The primary function of lens 320 is to introduce barrel distortion in the image on diffuser element 330 which compensates the pin cushion distortion inevitably introduced in the eye piece section of system 300. In the embodiment depicted in FIG. 3, the two lenses 320 and 325 are both Fresnel lenses constructed from acrylic. Fresnel lens 320 is convex and only contains a 4th order term. The thickness z of lens 320 as a function of radial distance y from the optical axis is defined by: $z=ad\ y^4$, where $ad=-1.8\times10^{-6}$ mm$^{-4}$. The primary purpose of lens 320 is to compensate the residual chromatic dispersion of the enlarger section 311. The dimensions of the lens clear area of lens 320 is ±33 mm in the y direction from its center, and ±23.5 mm in the x direction. The thickness of the blank for this lens is approximately 2 mm although other values are possible. The Fresnel rings of lens 320 are spaced at 0.2 mm. Lens 325 is a convex Fresnel lens, also made of acrylic, with a radius of curvature of 130 mm. The dimension of the lens clear area and the Fresnel ring spacing for lens 325 are the same as for lens 320. The combination of Fresnel lens 320 and 325 produce crisp, distortion-free image on diffuser screen 330.

In the alternative embodiment, lenses 320 and 325 may be replaced with a single real lens, without a change in image quality. As shown in FIG. 10, the single non-Fresnel lens 400 of the alternative embodiment is a spherical lens made from acrylic with a meniscus shape. The respective radii of curvature of the display and viewer facing surfaces are 324.069 mm (concave) and 64.814 mm (convex). The thickness at the center of this alternative lens 400 for lenses 320 and 325 is approximately 10 mm.

Diffusing screen 330, illustrated in FIG. 3, causes the light rays passing through the system to spread out by a small controlled amount. In the absence of this spreading, the viewer would only see the image for one particular location of his eyes relative to the optical system. The spread created by diffusing screen 330 enables the viewer to move his or her eye sideways by approximately ±8 mm and still see the entire image. This is important, both for the viewer and for taking into account the varying eye separation among the general population. Diffusing screen 330 must be located at the surface at which the image of the display is projected onto by the projection lens system 310, because it is this image which serves as the object viewed by the user through the eye pieces, 375, 380.

Diffusing screen 330 can be made in many different ways, as long as it spreads the light by the desired amount and not more than needed, which would reduce the brightness of the image. A preferred embodiment is a holographically produced diffuser, in which diffusing element 330 is created as a mechanical variation of one surface of an acrylic plate, so that it can be fabricated by molding. Such diffuser are well known in the art.

As can be seen in FIG. 3 the light rays from the projection lens system 310 are incident on the diffusing element 330 approximately parallel to the z axis (after being re-directed by lenses 320 and 325). For the light rays to reach the eye they must leave the diffusing element at a considerable angle from the z axis. If this re-direction of the light were to be achieved by the diffusing element, the light would have to be spread over a large range of angles, significantly reducing the optical efficiency of the system. Microprism beam splitter 340 overcomes this problem by splitting the light into two very different directions (angles +γ and −γ from the z axis, where angle γ is approximately 28 degrees). The spread around these directions is only large enough to provide full illumination for the various viewing positions, as described above. Highest optical efficiency is achieved in this way.

Element 340 must be a linear microprism array with a pitch that is at least a factor of 10 smaller than the pixel size of the image on the diffusing element 330, which is equal to the pitch of the pixel elements in display 305 magnified by the magnification factor of the projection lens system 310 (approximately 4 in the preferred embodiment). In this way, the light from every pixel element in the object encounters a number microprisms, assuring that its light will be split evenly between the eyes. If the prisms are too large (pitch too large) the light will be unevenly divided or directed only towards one of the eyes. Another reason for requiring a small pitch is to prevent noticeable moiré interferences between the pitch and the spacing of the pixels in the object. The diffusing element 330 and the microprism 340 must be located close to each other so that their separation does not exceed the depth of focus of the eye pieces 375, 380. Otherwise the image quality is impaired.

Figure 6:
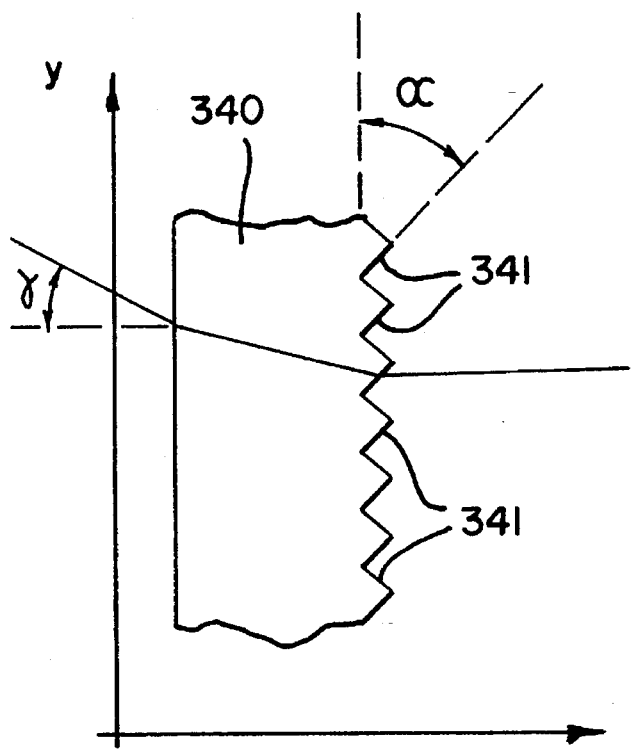
FIG. 6 shows a cross-section of a portion of the microprism beam splitter of the present invention.

As previously explained, microprism 340 serves to split the image impinging diffuser screen 330 into right hand and left hand images, deflecting them towards their respective eyepieces 375 and 380. FIG. 6 illustrates a cross-section of the novel symmetric triangular microprism beamsplitter 340 of the present invention. The deflecting elements 341 are a vertical array of contiguous, columnar microprisms, that are triangular in cross section. Microprisms 341 are approximately 0.02 mm wide at their base and half that in height. The acrylic blank on which the array of microprisms is formed is on the order of 2 mm thick. The interior angle α at the base of each microprism 341 is approximately 48 degrees. As seen in this Figure, an incoming light ray will be deflected at an angle γ. Applying Snell's law twice:

$$\gamma = \sin^{-1}(n*\sin(\alpha - \sin^{-1}(n^{-1}\sin\alpha)),$$

for γ=28° and prism index n=1.5, α therefore equals 48°.

As can be seen in FIG. 3, both eyes look at the same object, in this case the enlarged image of the source image from display 305 located on the diffusing element 330. The two eyes cannot look at this object directly, since the eyes would have to turn inward much more than is comfortable to the viewer. To overcome this effect, the light rays must be redirected. The first part of the change is accomplished by microprism 340. Because this element 340 is located at an image plane, it introduces no optical aberrations. A second deflection by an opposite amount −γ and +γ, respectively, is necessary in the eye piece to re-direct the rays parallel to the z axis towards the eyes. A prism could be used for this purpose, but it would be too large to fit the dimensions shown in FIG. 3. Instead, the off-axis rays are subsequently deflected by respective Fresnel lens/prisms 350a and 350b to redirect them along respective optical axes of eyepieces 375 and 380. The deflection by Fresnel lens 350a and 350b introduces some lateral color dispersion which must be corrected in order to present proper images to the user's eyes. Color correction is accomplished by the present invention by respective blazed diffraction gratings 345a and 345b.

Figure 7:
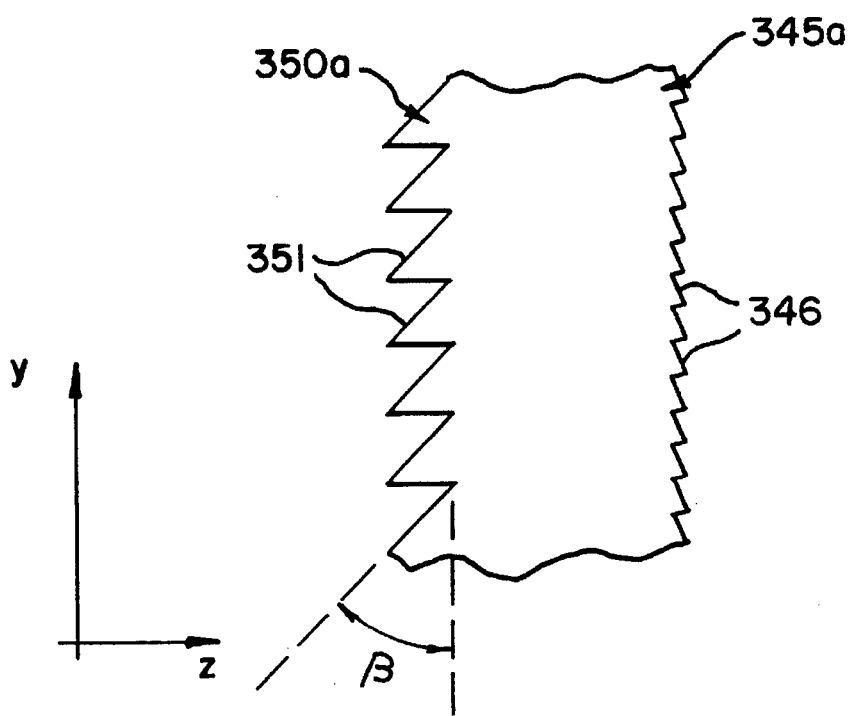
FIG. 7 illustrates a cross-section of a portion of the blazed grating and Fresnel prism of the present invention.

FIG. 7 depicts the y-z profile of lenses 345a and 350a in greater detail. The structure of lenses 345b and 350b are the same as that of lenses 345a and 350b and the below discussion applies equally to lenses 345b and 350b. As seen in this Figure, lenses 345a and 350a can be manufactured on opposite sides of the same blank in the same relative orientation. Lenses 345a and 350a have structure in only the y-direction. In the simplest embodiment, the facets on both sides are uniform in shape and size, so that the elements have no optical power, and only function as deflectors (with color correction). Lenses 345b and 350b are identical to lenses 345a and 350a, but the slope of the Fresnel facets are in the opposite direction. Each of these lenses is made from acrylic with a thickness of approximately 2 mm, although other thickness are possible.

In the preferred embodiment, the Fresnel prism 350a has a small amount of optical power in order to correct source aberration. The slope β of each facet 351 of Fresnel lens/prism 350a is given by the equation:

$$\beta = 46 - 1.26 \times 10^{-5}(32-y)^3$$

The lens clear area for lenses 350a and 350b is 63 mm in the y-direction, 50 mm in the x-direction. The width of each prism facet 351 is 0.02 to 0.5 mm.

Gratings 345a and 345b are triangular in cross-section, with a nominal periodicity of 0.021 mm and nominal height of 0.0011 mm for its facets elements 346. Gratings 345a and 345b are formed on the rear surfaces of the respective acrylic blanks for lenses 350a and 350b, rather than on the front surfaces (i.e., on top of facets 351 of each Fresnel lens/prism 350a and 350b). This configuration is used to avoid the problems associated with such a structure as noted earlier in connection with Johnson.

As stated previously, blazed gratings 345a and 345b are used for lateral color correction. A dispersive element, such as a prism, will lead to a separation of the red, blue and green images, as seen by the observer. This is known as lateral color. The point of best focus can also change as a function of wavelength; this is known as longitudinal color. The removal of such artifacts, and their higher order effects, is known as color correction.

In the case of optical system 300, shown in FIG. 3, the most troublesome dispersive element are the Fresnel prisms 350a and 350b. The dispersion of such thin prisms can be described by:

$$dD/d\lambda = D/(N-1)dN/d\lambda$$

(Warren Smith, Modern Optical Engineering, 2nd. edition, McGraw-Hill, New York, 1990, page 89) where D is an angle, N is the index of refraction and λ is the wavelength of the light passing through the prism. The term dN/dλ is negative for most optical materials. Achromatic prisms are possible and are described in Smith. The dependence of the angular deviation upon color can be removed by using two prisms in tandem, each with an optical material. Their applicability, however, is less compelling in situations where the prism apex angles become large.

An alternate solution exists, in which diffractive elements may be used. The grating equation implies that $$dD/d\lambda = M/P$$

where M is the order and P is the period. The right hand side can be either positive or negative depending upon the sign of M. Thus, the dispersion due to diffraction gratings can be used to cancel the dispersion inherent in optical materials.

Zoned gratings have been used to compensate for the chromatic aberrations of spherical lenses [H. Madjiidi-Zolbanine and C. Froehly, "Holographic correction of both chromatic and spherical aberrations of a single glass lens," Applied Optics 14 23;85, (1979)]. Diffraction gratings have been used to correct lateral color in holograms [J. N. Latta, "Analysis of Multiple Hologram Optical Elements with Low Dispersion and Low Aberrations," Applied Optics 11, 1686, (1972)].

In the present invention, the chromatic aberrations of the Fresnel prisms 350a and 350b are compensated by combining each prism with a diffraction grating of opposite dispersion to the prism. In order to have an electrically efficient viewing system (and to reduce the effects of scattered light) the diffraction grating should diffract as much light as possible into the one desired order. This would be achievable with a "thick" grating. Unfortunately, such a grating is not suited for a large volume manufacturing process, since it is difficult to replicate. Surface gratings are much easier to replicate. If the first order diffractive beam is desired, the grating 345a or 345b must have a period of approximately 0.021 mm. If the shape of the grating is arbitrary, diffracted beams of different orders will be generated and the image will be completely blurred. In order to select only the desired order, the grating must be blazed to the prismatic shape shown in FIG. 7, with a prism height of approximately 0.0011 mm. The optimum value must be determined for one wavelength (preferably in green) by calculating the diffraction exactly with the full Maxwell's equation. [M. G. Moharam and T. K. Gaylord, "Diffraction analysis of dielectric surface-relief gratings", J. Opt. Soc. Am. 72, 1385, (1982)].

For the preferred embodiment, it is calculated that in the green, almost 100% of the transmitted energy can be placed in the first order if the grating is of sufficiently high quality. The red and blue wavelengths will have approximately 90% of the transmitted energy in the first order, with at most 8% in either the second or the zero order. Tests show that this result is adequate for most display applications.

Further improvements can be made to the grating structures 345a and 345b. Since one can not expect the grating to be one hundred percent efficient, some provision can be made to block any undiffracted light. A Venetian blind material, such as a light control film from the 3M corporation, can be placed between the elements in a holographic cascade to reject light outside a of a particular angular range [T. Stone and N. George, "Wavelength performance of holographic optical elements:, Applied Optics 24, (1985)]. This modification can improve the contrast ratio of the color corrected virtual reality display.

An HMD incorporating the optical system of the present invention can be designed to be as slow as f/4 or even f/5 and yet maintain an entrance pupil diameter of 16 mm. The instantaneous pupil diameter is closer to 4 mm and the speed of the system drops below f/16. Thus, there is sufficient angular and temporal bandwidth to correct the color over the field of view with the eye looking down the optical axis. Experiments have shown that the color correction will also hold up even as the eye's gaze is brought off axis. The color correction method described above will correct lateral color due to the Fresnel prisms 350a and 350b. It will not correct the color aberrations due to the lens elements 355a and 355b, 360a and 360b, and 365a and 365b. Such aberrations would have to be treated either via conventional design employing "crown" and "flint" elements or diffractive structures on the lenses themselves.

Returning to FIG. 3, lenses 355a and 355b, 360a and 360b, and 365a and 365b are convex acrylic Fresnel lenses whose radii of curvature are, respectively 63 mm, 400 mm and 72 mm. These lenses perform the eye piece function. They form an image of the object displayed on the diffuser at a comfortable viewing distance. These lenses 355–365 are sufficiently large to provide the wide angle of view that is desired (>±30° diagonal). The optical power is divided among the three lenses in order to reduce the aberrations, so that the resolution of the image is high enough to resolve the pixel structure in the object over the central region for a range of eye positions. In the preferred embodiment the three Fresnel lenses 355a, 360a and 365a are offset from the optical axis (z axis) by −6 mm, −2 mm, and 3 mm, respectively, in order to remove some of the field tilt that arises from the deflection of the rays at the microprism structure 340. The Fresnel lenses 355b, 360b and 365b are offset from the z axis in an opposite amount to that described above. The lens clear area of lenses 355a and 355b is 63 mm in the y direction and 50 mm in the x direction. The clear area of lenses 360a and 360b is 60 mm in the y direction and 46 mm in the x direction. Lenses 365a and 365b have a clear area of 54 mm in y and 42 mm in x.

Figure 8:
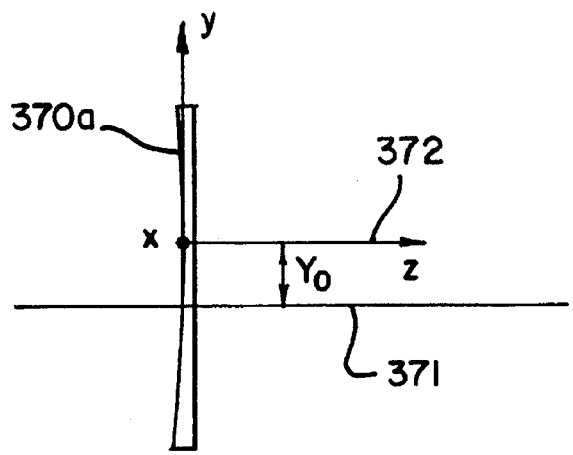
FIG. 8 is an enlarged view of one of the final eyepiece lenses.

Finally, lenses 370a and 370b are convex toroidal acrylic lenses that may be formed respectively on the back of lenses 365a and 365b. Lenses 370a and 370b are displaced 3 mm from the y-axis and serve to equalize the angular magnification in the x and y directions. The y-z profile of lens 370a is illustrated in FIG. 8. In this Figure, axis 371 represents the optical axis of the user's eye. A similar y-z profile for lens 370b would be a mirror image of this profile rotated about the optical axis for the user's other eye. Axis 372 is the optical axis of lens 370a. Torroidal lenses 370a and 370b are concave and are formed in accordance with the equation:

$$z = \frac{cvy(y-y_o)^2}{1+(1+cvy^2(y-y_o)^2)^{1/2}} + ad(y-y_o)^4$$

where cvy (curvature at $y=y_o$)=−0.0018 $mm^{-1}$, and ad=6× $10^{-7}$ $mm^{-4}$. In the z-x plane, the shape is a circle with a radius 833 mm. The fourth-order term in y-z plane serves to symmetrize the astigmatism along the y-axis about $y_o$. The lens clear area of lenses 370a and 370b is 42 mm in the x direction and 54 mm in the y direction. The thickness of these lenses at their center is approximately 2 mm, although other values are possible.

In the alternative embodiment of optical system 300 shown in FIG. 10, lenses 355a and 355b, 360a and 360b, 365a and 365b and 370a and 370b have been replaced by lenses 410a and 410b, and 415a and 415b. Lenses 410a and 410b are plano-convex acrylic lenses, whose radius of curvature is 71 mm and whose clear area from the z-axis is ±30 mm in the y-direction and ±20 mm in the x-direction. Lenses 415a and 415b are also plano-convex acrylic lenses with radius of curvature of 60 mm, and a clear area from the z-axis of ±25 mm in the y-direction and ±17 mm in the x-direction. Lenses 410a and 415a(and in the same way lenses 410b and 415b) form a high quality eye piece with the smallest number of components, as is well known in the art. This eye piece does not produce a color-corrected image and has considerable distortion, but the remaining aberrations are small. Color correction would require at least one additional large element. In the alternative embodiment of system 300 shown in FIG. 10, the pin cushion distortion of this eye piece is partially compensated by the barrel distortion produced by lens 400.

Figure 1A:
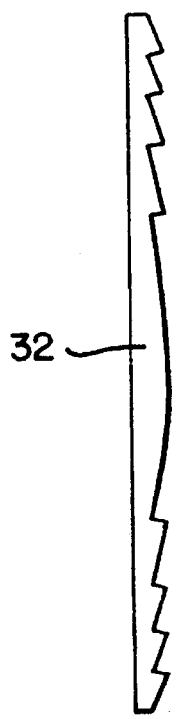
FIGS. 1A and 1B show a prior art approach to color compensation of a Fresnel lens, with FIG. 1B being an enlarged view of a segment of said lens.
Figure 1B:
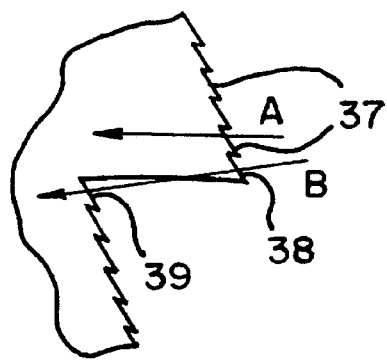
Figure 2A:
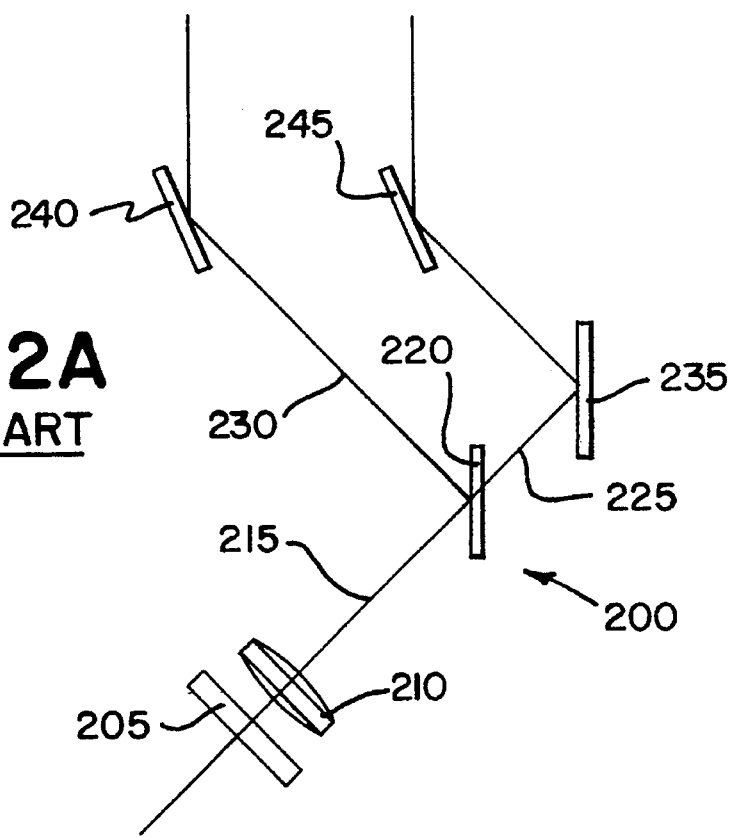
Figure 9:
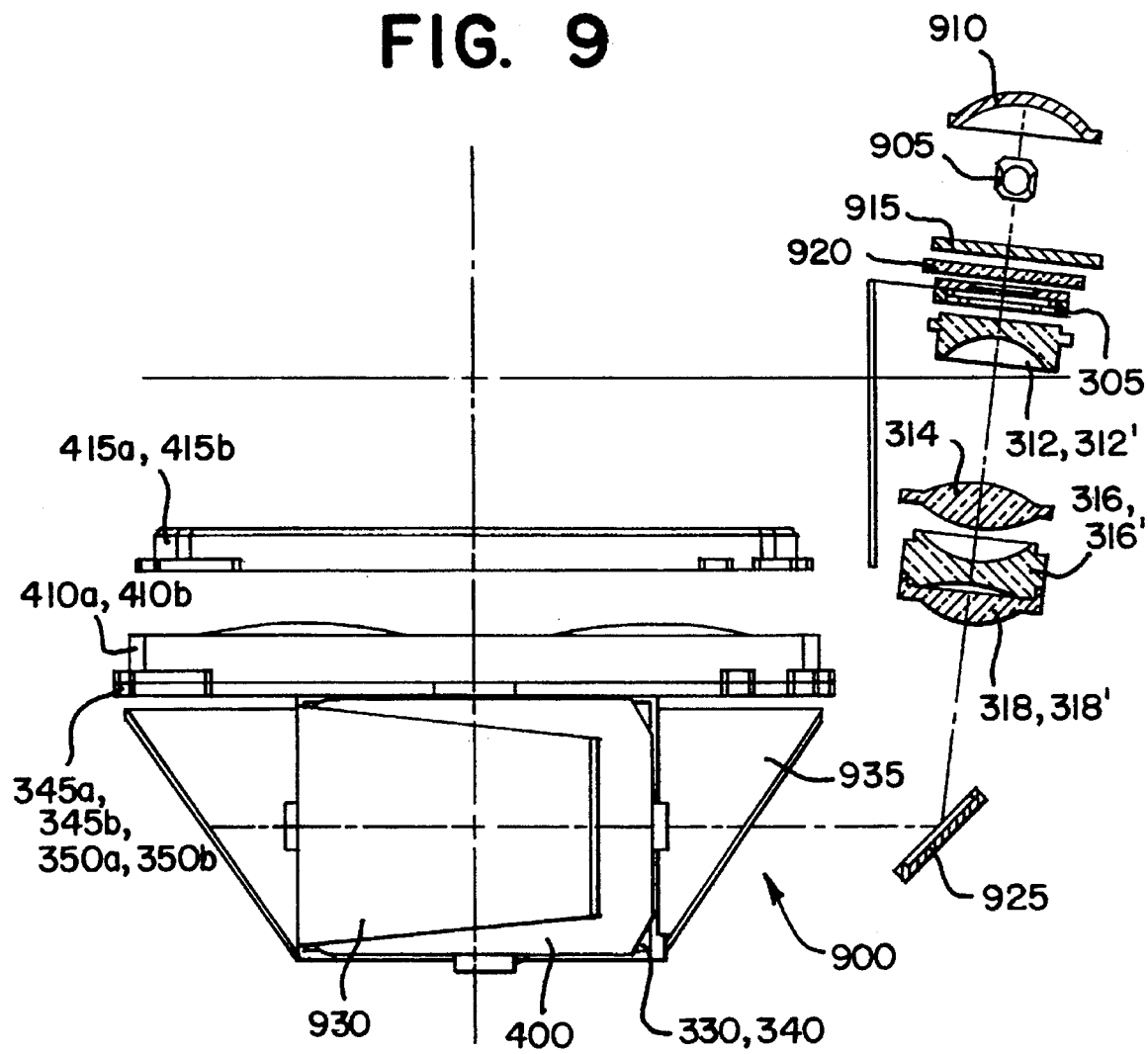
FIG. 9 shows a cross-section of an HMD incorporating the optical system of the present invention.

Having described the optical system of the present invention, FIG. 9 shows a cross section of a top view of an HMD 900 that might be used to house the optical system of the present invention. The total optical path length, as has earlier been noted in connection with FIG. 2, is on the order of 250 mm, some 10 inches. This is readily accommodated within the dimensions of a compact lightweight helmet of the sort illustrated here, leaving ample room for the headphones, wiring, optical components, and so on. As seen in this Figure, display 305 is back lit by lamp 905 with the aid of reflector 910. Element 915 is a thermal shield to prevent heat transfer form lamp 905 to display 305 which would adversely effect its performance. Fresnel lens 920 serves to evenly spread the light from lamp 905 and reflector 910 to display 305. The next element in front of LCD 305 is either lens 312 from the embodiment depicted in FIG. 3 or lens 312' from the embodiment shown in FIG. 10. The lenses which have previously been depicted in FIGS. 3 and 10 are similarly indicated in this Figure.

Element 925 is a fold mirror which reflects the projected image from display 305 approximately ninety degrees to fold mirror 930. Mirror 930 redirects the image downward (into the plane of the Figure) through lens 400. The image from lens 400 passes through diffuser 330 and is split into the two separate images for the left and right eyes by microprism beam splitter 340. The split images from microprism beam splitter 340 are reflected horizontally (towards the user's eyes) by fold mirror 935 to Fresnel lens/prisms 350a and 350b and blazed gratings 345a and 345b. As discussed earlier, Fresnel lens/prisms 350a, 350b deflect the light from microprism beam splitter 340 at an angle collinear with optical axes of the user's eyes. Finally, the HMD 900 incorporates the eyepiece lenses 410a, 410b and 415a, 415b.

The objects of this invention having been demonstrated to have been achieved, the following claims are made with the understanding that they are not exhaustive of the inventive matter contained herein, nor of the numerous modifications and combinations thereof that would be obvious to those skilled in the art without departing from the spirit of this invention.

We claim:

1. An optical system for a head mounted display apparatus comprising:

a display for producing a source image;

a microprism beamsplitter located in front of said display, said microprism beamsplitter splitting said source image into a right eye image and a left eye image;

left and right eye deflection optical elements located in front of said microprism beamsplitter, said deflection optical elements deflecting said left and right eye images from said microprism beamsplitter;

at least one left eyepiece optical element located in front of said left eye deflection optical element; and at least one right eyepiece optical element located in front of said right eye deflection optical element.

2. An optical system according to claim 1 wherein said left eye and said right eye deflection optical elements are Fresnel lens/prisms.

3. An optical system according to claim 2 further including:

a right eye diffraction grating located between said microprism beam splitter and said at least one right eyepiece optical element; and a left eye diffraction grating located between said microprism beam splitter and said at least one left eyepiece optical element, said diffraction gratings providing color correction for said left and right eye images.

4. An optical system according to claim 3 wherein said left eye and right eye diffraction gratings are respectively formed on an opposite surface of said left eye and right eye deflection optical elements.

5. An optical system according to claim 4 wherein said left eye and right eye diffraction gratings are triangular in cross section with a periodicity of approximately 21 micrometers and a height of approximately 1 micrometer.

6. An optical system according to claim 1 wherein said microprism beam splitter is a linear array of microprisms.

7. An optical system according to claim 6 further including:

a diffusing screen located between said display and said microprism beam splitter.

8. An optical system according to claim 7 wherein a pitch of each of said microprisms is approximately a factor of ten smaller than the size of a pixel on said diffusing screen.

9. An optical system for a head mounted display apparatus comprising:

a display;

a plurality of projection optical elements positioned in front of said display, said plurality of projection optical elements magnifying an image appearing on said display;

a microprism beamsplitter located in front of said plurality of projection optical elements, said microprism beamsplitter splitting said magnified image into a right eye image and a left eye image;

left and right eye deflection optical elements positioned in front of said microprism beamsplitter, said deflection optical elements deflecting said left and right eye images from said microprism beamsplitter; and a plurality of left eyepiece optical elements and a plurality of right eyepiece optical elements located respectively in front of said left eye deflection optical element and said right eye deflection optical element.

10. An optical system according to claim 9 wherein said plurality of projection optical elements further comprises:

an enlargement section positioned in front of said display; and at least one optical element in front of said enlargement section for redirecting said image from said enlargement section along an optical axis of said microprism beam splitter.

11. An optical system according to claim 10 wherein said enlargement section further comprises:

a field flattener lens;

a biconvex lens; and a doublet of a biconcave lens and a biconvex lens.

12. An optical system according to claim 11 wherein said at least one optical element in front of said enlargement section is comprised of two Fresnel lenses.

13. An optical system according to claim 11 wherein said at least one optical element in front of said enlargement section is a spherical non-Fresnel lens.

14. An optical system according to claim 9 wherein said left eye and said right eye deflection optical elements are Fresnel lens/prisms.

15. An optical system according to claim 14 wherein said left eye and said right eye deflection Fresnel lens/prisms each have facets whose slopes, $\beta$, are approximately $46-1.26 \times 10^{-5}(32-y)^3$, where y is the distance of said facet from the optical axis of said Fresnel lens/prisms said distance being measured in the plane containing the centers of said left and right eyepiece optical elements and said optical axis.

16. An optical system according to claim 9 wherein said plurality of left eyepiece optical elements and said plurality of right eyepiece optical elements are each comprised of three Fresnel lenses and a convex torroidal lens.

17. An optical system for a head mounted display apparatus comprising:

a display;

a plurality of projection optical elements positioned in front of said display, said plurality of projection optical elements magnifying an image appearing on said display;

a diffusing screen positioned in front of said plurality of projection optical elements, said diffusing screen diffusing said magnified image;

a microprism beamsplitter positioned in front of said diffusing screen, said microprism beamsplitter splitting said diffused image into a right eye image and a left eye image;

a left eye deflection optical element, said left eye deflection optical element deflecting said left eye image from said microprism beamsplitter onto a left eye optical axis;

a right eye deflection optical element, said right eye deflection optical element deflecting said right eye image from said microprism beamsplitter;

a right eye diffraction grating located next to said right eye deflection optical element;

a left eye diffraction grating located next to said left eye deflection optical element;

a plurality of left eyepiece optical elements located in front of said left eye diffraction grating; and a plurality of right eyepiece optical elements located in front of said right eye diffraction grating.

18. An optical system according to claim 17 wherein said plurality of projection optical elements, said plurality of left eyepiece optical elements and said plurality of right eyepiece optical elements each include at least one Fresnel lens.

* * * * *